(12) United States Patent
Hornsby et al.

(10) Patent No.: US 12,259,799 B1
(45) Date of Patent: Mar. 25, 2025

(54) IDENTIFYING FAULT-INJECTION IMPACT ZONES

(71) Applicant: Amazon Technologies, Inc., Seattle, WA (US)

(72) Inventors: Adrian John Hornsby, Espoo (FI); Laura Wingert Thomson, South Queensferry (GB); Warren Robert Russell, Dublin (IE); Alan O'Leary, Dublin (IE); Serafin Antonio Sedano Arenas, B (ES)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 18/126,944

(22) Filed: Mar. 27, 2023

(51) Int. Cl.
| | | |
|---|---|---|
| *G06F 11/00* | (2006.01) | |
| *G06F 11/26* | (2006.01) | |
| *G06F 11/263* | (2006.01) | |

(52) U.S. Cl.
CPC .......... *G06F 11/261* (2013.01); *G06F 11/263* (2013.01)

(58) Field of Classification Search
CPC .. G06F 11/261; G06F 11/263; G06F 11/3696; G06F 11/3664; G06F 11/3668; G06F 11/3672
See application file for complete search history.

(56) References Cited

U.S. PATENT DOCUMENTS

| | | | | |
|---|---|---|---|---|
| 9,058,428 | B1* | 6/2015 | Siddiqui | G06F 8/71 |
| 9,842,045 | B2* | 12/2017 | Heorhiadi | G06F 11/3692 |
| 10,684,940 | B1* | 6/2020 | Kayal | G06F 11/3664 |
| 2009/0240759 | A1* | 9/2009 | Miyamoto | G06F 11/3495 |
| | | | | 709/201 |
| 2011/0029956 | A1* | 2/2011 | Ledenev | G06F 11/3696 |
| | | | | 717/125 |
| 2016/0283348 | A1* | 9/2016 | Golde | G06F 8/70 |
| 2021/0191706 | A1* | 6/2021 | Sn | G06F 11/3466 |

* cited by examiner

*Primary Examiner* — Marc Duncan
(74) *Attorney, Agent, or Firm* — Knobbe Martens Olson & Bear LLP

(57) ABSTRACT

Disclosed are various embodiments for identifying fault injection impact zones. A test for an application can be received from a test service. An application schema can then be created that represents the systems or services that are involved in the execution of the application. Applications with a similar application schema are then identified using a first machine-learning model. A subset of the plurality of applications that have experienced a similar test are then identified with a second machine-learning model. Log files associated with each of the subset of applications are then analyzed to identify errors that occurred during the similar test. Each of the identified errors are then provided to the test service in response to receipt of the test.

19 Claims, 5 Drawing Sheets

IDENTIFYING FAULT-INJECTION IMPACT ZONES

BACKGROUND

Chaos engineering is a term used to describe approaches to testing the resiliency of computer systems in the face of unexpected external conditions. Chaos engineering may include intentionally introducing unexpected or unplanned faults into a system to determine how the system will react in response to the fault. The results of such experiments can then be evaluated to determine whether the system can provide an adequate quality of service, or any service at all, when faced with unexpected or unplanned faults. For example, chaos engineering principles can be used to verify that a redundant system architecture provides an acceptable level of service in response to a failure of one or more components. As another example, chaos engineering principles can be used to identity the tipping point(s) at which a system would fail to provide adequate service in response to one or more failures or faults in the system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

When following chaos engineering principles to determine the impact of failures on a computer system or application, unexpected results may be uncovered. For example, an unexpected system dependency may fail as a result of simulating faults during a chaos engineering test, performed for example by a fault injection service of a provider network on an application that runs on the network. As a result, performing chaos engineering test in production environment can be inherently risky due to unforeseen consequences.

To minimize or mitigate the unforeseen consequences, system administrators often attempt to gauge or identify which systems or services could potentially be impacted or effected by a chaos engineering test. The collection of systems or services that would or could be impacted or effected can often be referred to or characterized as the "impact zone" or "blast radius" of the test.

Disclosed are various approaches for identifying systems or services that are likely to be impacted when executing a test using a fault injection service, and therefore would fall within the "impact zone" or "blast radius" of the test. Various embodiments of the present disclosure can build an application schema that identifies all of the systems or services that form the application to be tested. However, different test scenarios could impact different sets or subsets of the systems or services identified. Accordingly, various embodiments of the present disclosure may use machine-learning techniques to identify similarly structured applications that have been tested in similar manners. Machine-learning techniques could then be used to determine which systems or services were impacted, as well as how they were impacted. Similarly, previous iterations of the test could be analyzed using machine-learning techniques to predict which systems or services are likely to be impacted, as well as how they are likely to be impacted, in future iterations of the test. Moreover, some implementations of the present disclosure could duplicate an application and execute a test on the duplicated version of the application. The results of the test on the duplicated version of the application could then be used to predict how the application would be impacted if the test were performed on the application in a production environment.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
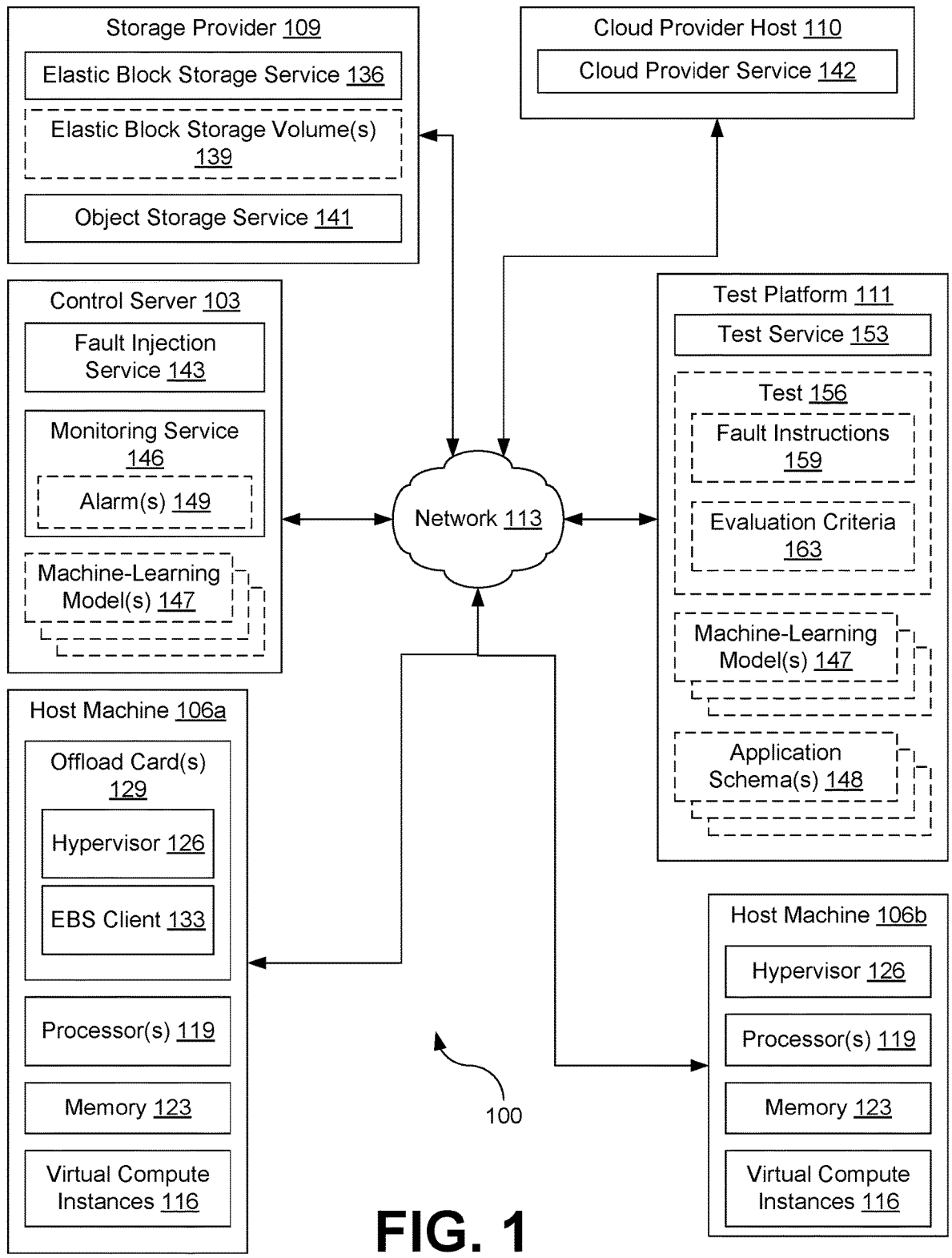
FIG. 1 is a schematic block diagram of a cloud provider network according to various embodiments of the present disclosure.

FIG. 1 illustrates a cloud provider network 100 according to various embodiments of the present disclosure. The cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network 100, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network 100 to provide low-latency resource access to customers on a global scale with a high degree of fault tolerance and stability.

The cloud provider network 100 can be used to provide cloud computing services to end users. With cloud computing, instead of buying, owning, and maintaining their own data centers and servers, organizations can acquire technology such as compute power, storage, databases, and other services on an as-needed basis. The cloud provider network 100 can provide on-demand, scalable computing platforms to users through a network, thereby allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The traffic and operations of the cloud provider network 100 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers 103. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Accordingly, the cloud provider network 100 can include a number of components. For example, the cloud provider network 100 could include a control plane that includes one or more control servers 103. The could provider network 100 could also include one or more host machines 106a, 106b, etc. (collectively referred to as "host machines 106"), a storage provider 109, one or more cloud provider hosts 110, and one or more test platforms 111.

All of these components can be in data communication with each other via a network 113. The network 113 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The control server 103 can represent one or more servers that implement or provide control plane operations over the logical control plane of the cloud provider network 100. To assist in the implementation of control plane operations, the control server 103 may implement various control services. These control services can provide an administrative interface for configuring the operation of individual components of the cloud provider network 100, such as configuring one or more host machines 106 to provide the resources requested by a user of the cloud provider network 100. As an example, the control services hosted by the control server 103 may provide a mechanism that allows users to allocate or modify the resources consumed by the user of the cloud provider network 100. This can include instantiating or modifying computing, networking, or storage resources provided by the cloud provider network 100. For instance, the control server 103 could implement user commands to create, modify, or terminate virtual machines hosted by cloud provider network 100, assign storage to virtual machines, create pools of shared storage, etc.

One or more host machines 106 may also be present in the cloud provider network 100. Each host machine 106 can provide an operating environment for one or more virtual compute instances 116. In addition, each host machine 106 can include one or more processors 119 and memory 123, which can be allocated to individual ones of the virtual compute instances 116. Moreover, a host machine 106 can have a hypervisor 126 installed to manage and coordinate the execution of any virtual compute instances 116 hosted by the host machine 106. The host machines 106 could be deployed, for example, as a part of an elastic cloud service (referred to in various implementations as an elastic compute service, a virtual machines service, a computing cloud service, a compute engine, or a cloud compute service).

The cloud provider network 100 may offer virtual compute instances 116 (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances 116 may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It will be appreciated that such virtualized compute instances 116 may also be able to run in other environments, for example on the premises of customers, where such on-premise instances may be managed by the cloud provider or a third party. In some scenarios, the virtual compute instances 116 may be micro-virtual machines (microVMs). The cloud provider network 100 may offer other compute resources in addition to instances and microVMs, such as containers (which may run in instances or bare metal) and/or bare metal servers that are managed by a portion of a cloud provider service running on an offload card of the bare metal server.

The hypervisor 126, also known as a Virtual Machine Manager (VMM), allows multiple virtual compute instances 116 (e.g., virtual machines) to run on and share the same underling hardware. Each operating system created by and run/controlled by the hypervisor 126 is called a domain or guest OS, and the hypervisor's operating system, if any, is called the host OS. The hypervisor exists outside of a guest OS to intercept the commands sent to the computer hardware.

In some embodiments, the execution of virtual compute instances 116 is supported by hypervisor 126 in the role of a lightweight virtual machine manager (VMM). These lightweight VMMs enable the launch of lightweight microVMs in non-virtualized environments in fractions of a second. These lightweight VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host machine 106. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

In some implementations, customers of a cloud provider can deploy containers by managing clusters of virtual compute instances 116 that run container agents. In such implementations, customers manage scaling, monitoring, patching, and security of the virtual compute instances 116, in addition to managing their containerized workload. In some implementations, customers of a cloud provider may deploy and scale containerized workloads automatically without having to manage the underlying computing resources, for example via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of virtual compute instances 116 on behalf of the customer.

In some implementations, at least a subset of virtualization management tasks may be performed at one or more offload cards 129 so as to enable more of the processing capacity of the host machine 106a to be dedicated to client-requested compute instances—e.g., cards connected via PCI or PCIe to the physical CPUs 119 and other components of the virtualization host may be used for some virtualization management components. Such an offload card 129 of the host machine 106 can include one or more CPUs that are not available to customer instances, but rather are dedicated to instance management tasks such as virtual machine management, input/output virtualization to network-attached storage volumes, local migration management tasks, instance health monitoring, and the like.

For example, a host machine 106a could use the CPUs of the offload card 129 to execute the hypervisor 126 managing the virtual compute instances 116 on the host machine 106a. This would be in contrast to a host machine 106b, where a hypervisor 126 consumes at least some of the resources of the processors 119 and memory 123 of the host machine 106b that would otherwise be available to the virtual compute instances 116 hosted on the host machine 106b.

As another example, a host machine 106a could execute an elastic block store client 133. The elastic block store (EBS) client 133 may be implemented on an offload card 129 that is connected to and controls the host machine 106a that includes the processing units (e.g., CPUs or GPUs) of the compute instance. The elastic block store client 133 represents instructions that enable a virtual compute instance 116 to connect to, and perform I/O operations at, a remote data volume (e.g., a data volume stored on a physically separate computing device accessed over a network), such as data storage provided by the storage provider 109. For example, the EBS client 133 could communicate with an EBS service 136 hosted by the storage provider 109 to create an attachment between one or more EBS volumes 139 and one or more virtual compute instances 116 hosted on the host machine 106a. An attachment between an EBS volume 139 and a virtual compute instance 116 refers to the establishment of a connection between the virtual compute instance 116 and the EBS volume 139 made by the EBS client 133. This connection may be referred to as a "lease" in some implementations, and it enables the virtual compute instance 116 to view the EBS volume 139 as if it were a local storage drive, even though the EBS volume 139 and the virtual compute instance 116 may be hosted on different physical machines and communicating over a network.

An EBS service 136 (referred to in various implementations as a cloud disks service, a managed disk service, a cloud block storage service, storage area network (SAN) service, a persistent disk service, a block volumes service, etc.) can be executed to provision and manage EBS volumes 139. The EBS volumes 139 can represent raw, block-level storage provided by the EBS service 136 that can be attached to a virtual compute instance 116 through an EBS attachment created by an EBS client 133. A range of possible EBS volumes 139 may be provided or offered by the EBS service 136, such as solid state drive (SSD) backed volumes that offer low-latency response times for random IO or disk-backed volumes that provide low-cost or high-throughput storage.

The storage provider 109 can also host an object storage service 141. An object storage service 141 can be executed by the storage provider 109 to provide an object store that manages data as objects. Each object stored in the object storage service 141 can include data about itself and a globally unique identifier that distinguishes the object from other objects stored by the object storage service 141. Due to the object-based nature of the object storage service 141, users can often store large amounts of unstructured data in a cost-effective manner. The object storage service 141 can offer object storage, access, and retrieval through the network 113 (e.g., through the use of a web or network-based API). Examples of Object storage services 141 can include AMAZON WEB SERVICES S3, MICROSOFT AZURE BLOB STORAGE, GOOGLE CLOUD STORAGE, and RACKSPACE FILES.

One or more cloud provider host(s) 110 can be in the cloud provider network 100 to host and provide various cloud provider services 142 to customers, users, and consumers of the cloud provider network 100. Cloud provider host(s) 110 can include both bare-metal and virtual machines, which can host individual instances of cloud provider services 142.

Cloud provider services 142 can include any network accessible service that provides functionality that could be used by a virtual compute instance 116 or an application hosted by a virtual compute instance 116. Examples of cloud provider services 142 include network services such as managed databases (e.g., relational databases, key-value stores, etc.), domain name service (DNS) servers, function-as-a-service platforms (e.g., AMAZON AWS LAMBDA, GOOGLE CLOUD FUNCTIONS, MICROSOFT AZURE FUNCTIONS, APACHE OPENWHISK, etc.), software as a service platforms (e.g., hosted applications), etc.

One or more of these resources can be combined together to form an application that provides a service or other functionality to a user. A simple application could include a virtual compute instance 116 that hosts a web server and makes use of an elastic block storage volume 139 to store files for a website. An application could also make use of one or more services made available by a cloud provider service 142, such as a database, to store searchable content or data used by the website. More complicated applications could make use of additional resources, such as multiple virtual compute instances 116 performing various functions spread across multiple hosts 106 and utilizing various resources made available through one or more cloud provider services 142, with data being stored using the object storage service 141 and/or using one or more elastic block storage volumes 139. In many instances, an application may be described, defined, or represented using an application architecture schematic file, which can define the application's architecture schema by identifying the components of the application and illustrating or specifying the dependencies of, relationships between, or interactions with the components of the application.

A control server 103 can execute one or more services that interact with the previously described components of the cloud provider network 100. These services can include a fault injection service 143 and a monitoring service 146. Also, one or more machine-learning models 147 and/or one or more application schemas 148 can be stored on or by the control server 103 for use with the fault injection service 143 or the monitoring service 146. While reference numeral 143 is referred to herein primarily as the fault injection service, in some implementations 143 may be considered as a fault injection orchestrator, while the test service 153 may be considered as the fault injection service.

The fault injection service 143 can be executed to create or introduce unexpected or unplanned failures or errors into a system hosted by the cloud provider network 100. Generally, the fault injection service 143 can introduce a fault specified by a user or owner of the cloud provider network 100 resource(s) to be tested. This could be singular fault that will last for a predefined duration of time, or a series of faults that are introduced in series or parallel as part of a larger experiment. Because the fault injection service 143 is hosted on a control server 103 that is a component of the logical control plane of the cloud provider network 100, the fault injection service 143 can communicate directly with the host machines 106, offload cards 129, storage provider 109, or network 113 to introduce faults. In contrast, customer or user installed agents executing on customer virtual compute instances 116 may be unable to access the underlying hardware (e.g., host machines 106) or services of the cloud provider network 100 to introduce faults for system or application testing purposes.

There are many different types of faults that could be introduced into the cloud provider network 100 by the fault injection service 143. As an illustrative example, the fault injection service 143 could send a command to the hypervisor 126 that instructs the hypervisor 126 to alter (e.g., reduce or otherwise throttle) the processor(s) 119 or memory 123 resources made available to a specified virtual compute instance 116. This could include altering the amount of processor 119 cycles made available to the virtual compute instance 116. For example, the number of processor 119 cycles could be reduced to simulate resource contention for the processor 119 of the host machine 106. This could also include altering (e.g., reducing) the amount of memory 123 made available to the specified virtual compute instance 116 to simulate resource contention for the memory 123 of the host machine 106. In a similar example, the fault injection service 143 could send a command to the hypervisor 126 that instructs the hypervisor 126 to alter (e.g., reduce) the network bandwidth available to the specified virtual compute instance 116 to simulate a congested connection to the network 113. Likewise, the fault injection service 143 could send a command to the hypervisor 126 that instructs the hypervisor 126 to drop a specified percentage of packets sent from or destined for the specified virtual compute instance 116 to simulate a congested connection to the network 113. The fault injection service 143 could also send a command to the hypervisor 126 that instructs the hypervisor 126 to delay delivery of a specified number or percentage of packets sent from or destined for the specified virtual compute instance 116 by a specified amount of time to simulate latency in the connection with the network 113. As another illustrative example, the fault injection service could send a command to the EBS client 133 to drop or delay packets sent to or received from a specified EBS volume 139 attached to the specified virtual compute instance 116, which could have the effect of simulating an IO resource bottleneck. Similarly and alternatively, the fault injection service 143 could send a command to the EBS service 136 to delay responses or refuse to respond to IO requests for a specified EBS volume 139. This could also have the effect of simulating an IO resource bottleneck.

The fault injection service 143 can also cause more catastrophic faults to be simulated, such as service outages within the cloud provider network 100. For example, the fault injection service 143 could send a command to a hypervisor 126 to terminate or power-off one or more virtual compute instances 116 hosted on the host machine 106. As a similar example, the fault injection service 143 could send a command to the hypervisor 126 to drop all network traffic destined for or sent by the specified virtual compute instances 116. In either situation, the apparent effect would be that one or more host machines 106 (e.g., individual servers, individual data centers, or individual regions or availability zones) had become unavailable due to some sort of service, hardware, or network outage.

The monitoring service 146 can be used to receive monitoring data, events, or notifications from virtual compute instances 116, EBS clients 133, hypervisors 126, the elastic block storage service 136, network devices, or applications hosted using the various resources of the cloud provider network 100. The monitoring service 146 can also receive monitoring data, events, or notifications from third-party services. The monitoring service 146 can then surface information to users regarding the performance or utilization of their applications or the resources assigned to their applications. An example of a monitoring service 146 is AMAZON CLOUDWATCH, although similar services also exist.

For example, the monitoring service 146 could receive periodic reports (e.g., every minute, every fifteen (15) minutes, every hour, etc.) from host machines, hypervisors 126, applications hosted by virtual compute instances 116, the storage provider 109, the elastic block storage service 136, etc. The monitoring service 146 could then determine whether or not an alarm 149 had been triggered. If the alarm 149 had been triggered, the fault injection service 143 could be notified, causing any fault introduced by the fault injection service 143 to be reversed. An alarm 149 can represent a user or customer created rule that, when triggered, sends a notification to a specified target, such as the fault injection service 143. However, in some instances, the monitoring service 146 could also use machine-learning techniques to suggest or create its own alarms 149.

Moreover, the monitoring service 146 could receive periodic reports from third-party services that provide additional information that could be used as the basis for an alarm 149. For example, the monitoring service 146 could be configured to subscribe to, or receive periodic reports from, a ticket or defect tracking service (e.g., JIRA), a status indicator, a service-level agreement (SLA) monitor, or various social media platforms that provide public access (e.g., TWITTER, REDDIT, MASTODON, etc.). User created or machine-learning created alarms 149 could also be created to trigger based on the data received from the ticket or defect tracking service, status indicator, SLA monitor, or social media platforms.

Figure 2:
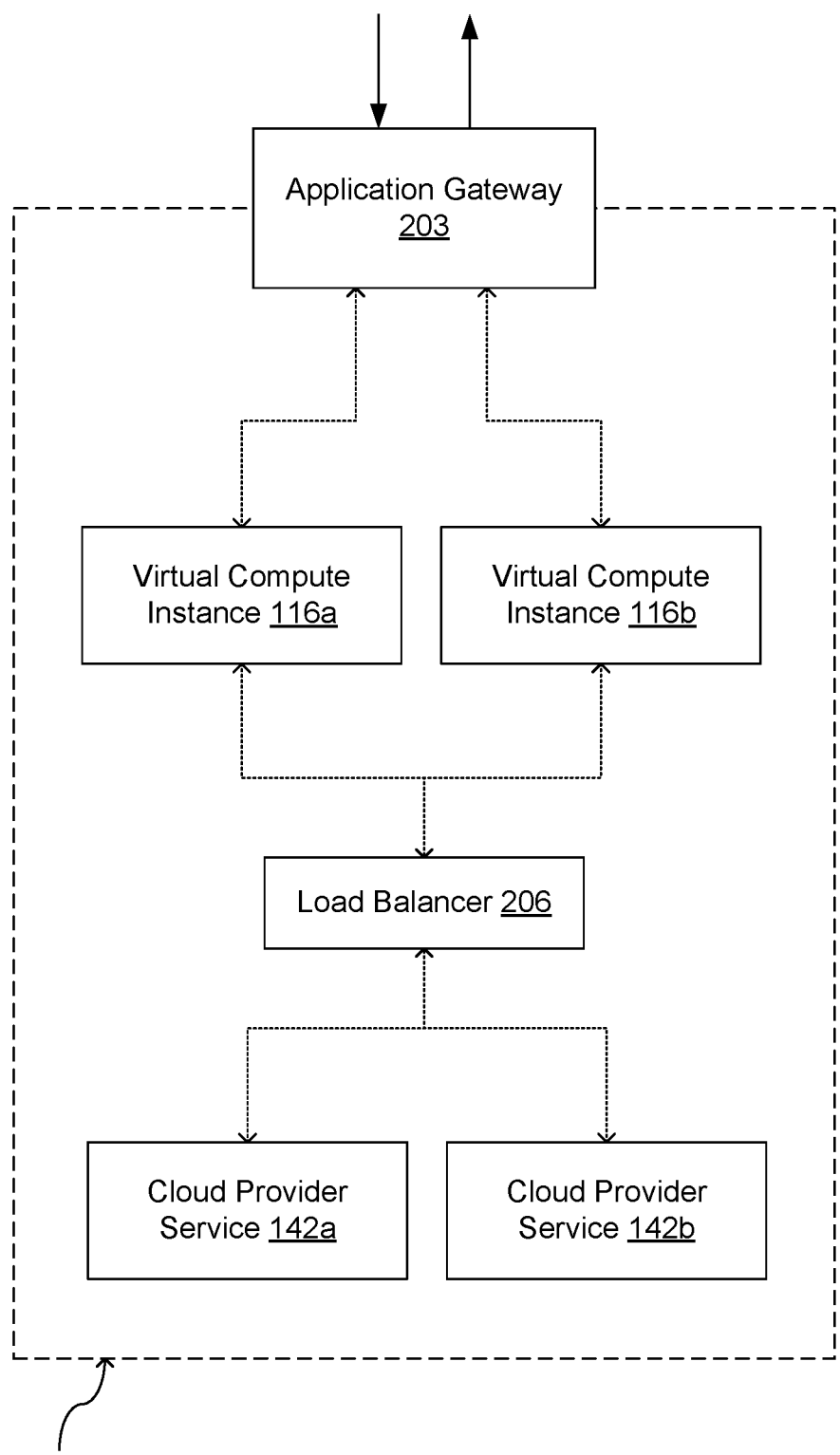
FIG. 2 is a schematic block diagram of an application deployed within the cloud provider network of FIG. 1 according to various embodiments of the present disclosure.

The machine-learning models 147 can be used by the fault injection service 143 or the test service 153 to predict the impact of a given test 156 on a given application 200 (FIG. 2). For example, a machine-learning model 147 could be used to identify applications 200 (FIG. 2) with application schemas 148 that are similar to each other in order to make predictions about a test 156 based at least in part on how the test 156 impacted similar applications 200. As another example, a machine-learning model 147 could be used to determine whether two tests 156 are similar to each other in order to make a prediction about how a test 156 might impact an application 200 based at least in part on similar tests 156 have impacted the application 200 or similar applications 200. Machine-learning models 147 could also be trained and used to analyze application 200 behaviors or logs associated with applications 200 in order to determine which errors in application 200 are the result of a test 156 compared to what might be considered normal or expected errors or behavior.

The test platform 111 can represent any physical or virtual host that can execute or otherwise implement the test service 153. While depicted separately for the purpose of clarity, the test platform could be implemented as a virtual compute instance 116 on one or more most host machines 106 within the cloud provider network 100, or as a physical (e.g., "bare-metal") computing device within the cloud provider network 100. One or more machine learning models 147 and/or one or more application schemas 148 could also be stored on or otherwise accessible to the test platform 111.

The application schemas 148 represent the architecture of respective applications 200. Each applications schema 148 can include information about the components and/or dependencies of an application 200, such as the number and type of virtual compute instances 116, cloud provider services 142, object storage services 141, elastic block storage volumes 139, and other services or systems that are used to deploy an application 200. Moreover, an application schema 148 can specify the relationships between the components and/or dependencies.

The test service 153 can be implemented to execute and analyze the results of one or more tests 156. Accordingly, the test service 153 could invoke the fault injection service 143 to introduce faults in various components of the cloud provider network 100, as specified in one or more fault instructions 159 of a test 156. Similarly, the test service 153 could also receive messages from the monitoring service 146 regarding the impact or effect of a fault introduced by the fault injection service 143 to determine whether a test 156 passed or failed according to one or more evaluation criteria 163.

A test 156 can represent a fault or series of faults to be introduced into cloud provider network 100 in order to test, analyze, or evaluate how the cloud provider network 100, or virtual compute instances 116 within the cloud provider network 100 or applications that are hosted by or rely upon the services provided by the cloud provider network, would react in response to the occurrence of the faults. Accordingly, a test 156 can specify one or more fault instructions 159 to use to conduct the test 156 and one or more evaluation criteria 163 to determine whether the test 156 is passed or failed. The test 156 can also specify a recipient for notifications regarding whether the test 156 is passed or failed.

Fault instructions 159 can specify the type of fault to be introduced into the cloud provider network 100, the duration of the fault, the target of the fault, one or more fault parameters that specify how the fault is to be cause or implemented, and potentially other information. The target of the fault can represent the service, system, or application that will be implementing the fault, as further discussed. The additional information could, for example, identify which of the virtual compute instance(s) 116 are to be faulted.

Evaluation criteria 163 can represent the criteria used to determine whether a test 156 is passed or failed. In simple tests 156, a single evaluation criterion 163 may be present. However, comprehensive tests can include multiple evaluation criteria 163. Different types of evaluation criteria 163 can also be used, depending on the type of data to be analyzed to determine whether a test 156 passes or fails and based on how success or failure of the test 156 is defined.

In some implementations, the evaluation criteria 163 can specify one or more alarms 149, which may have been specially created for the purpose of evaluating the results of the test 156. If one or more of the alarms 149 are triggered, the test 156 could be deemed to have failed. If none of the alarms 149 are triggered, the test could be deemed to have passed. The use of alarms 149 can be useful to determine whether a particular fault will have a measurable, technical impact on performance of the virtual compute instances 116 or applications hosted using the virtual compute instances 116.

In other implementations, the evaluation criteria 163 could include one or more instances of executable code that could be executed to analyze one or more components or parameters of the cloud provider network 100 to determine whether the test 156 passed or failed. In these implementations, the executable code could be evaluated by any appropriate runtime environment. In some instances, a copy of the executable code itself could be included in the evaluation criteria 163. In other instances, the network address or location of the executable code could be specified, as well as any arguments required for the executable code. For example, the executable code could include a package or container that includes or specifies one or more tasks or functions to be performed. This container could be pre-provisioned with an event-driven, serverless computing platform, which can execute the package or container in response to receiving a notification of an event occurring. Such platforms may be referred to as "function as a service (FaaS)" platforms (e.g., AMAZON AWS LAMBDA, GOOGLE CLOUD FUNCTIONS, MICROSOFT AZURE FUNCTIONS, APACHE OPENWHISK, etc.). An example of an event that could serve as a trigger for execution of the code could be initiation or completion of the test 156.

Executable code could be used as an evaluation criterion 163 for a number of reasons. For example, the executable code could be used in order to access data or platforms outside of the cloud provider network 100. As another example, the executable code could be used in order to evaluate performance metrics that are not captured or recorded by the monitoring service 146. For instance, a test 156 may pass if an operations center responds to a fault in less than a predefined amount of time. Accordingly, executable code could be used to determine whether a member of the operations center undertook some action within the predefined amount of time.

Next, a general description of the operation of the various components of the cloud provider network 100 is provided. Although the following description provides an illustrative example of the operation of, and interaction between, the various components of the cloud provider network 100, other interactions may also occur in various implementations of the present disclosure.

To begin, a user may wish to experiment with a system hosted by the cloud provider network 100 to determine the resiliency of the system to unexpected faults. Accordingly, the user may identify one or more faults or types of faults that he or she wishes to observe. The user could create a test 156, that includes one or more fault instructions 159 and/or one or more evaluation criteria 163.

However, the user may wish to perform a dry-run of the test 156 to determine which components of an application 200 or the cloud provider network 100 are likely to be impacted, as well as how they are likely to be impacted. For example, before performing a test 156 on a production application 200, the user may wish to see predictions of the impact of the test 156. For example, a user might want to see the list of systems and services likely to be impacted by the test 156 in order to confirm that there would not be any unexpected outages or disruptions. As a simple example, a user executing a test 156 of a first application 200 might want a dry-run to be performed to confirm that the test 156 would not impact a second application 200. The test service 156 could therefore send the test 156 to the fault injection service 143 and request that the fault injection service 143 perform the dry-run of the test 156 and report the results. The fault injection service 143 could perform a dry-run of the test using a variety of approaches.

For example, the fault injection service 143 could create an application schema 148 by sending test traffic to the application 200. Any systems or services that receive the test traffic could be included in the application schema 148 for the application 200. The application schema 148 could then be returned to the test service 153, which could present the list of systems and services in the application schema 148 as a list systems or services that could be potentially impacted by the test 156 if it were to run. These systems or service might be referred to as being within the impact zone or blast radius of the test 156.

In another example, the fault injection service 143 could use machine-learning to make predictions about how the test 156 would impact the application 200 based at least in part on the application schema 148 for the application 200. For example, the fault injection service 143 could use a machine-learning model 147 to identify other applications 200 with similar application schemas 148. The fault injection service 143 could then use a second machine-learning model 147 to predict how the test 156 would perform based on the results of the test 156 being performed on the applications 200 with similar application schemas 148. In some instances, the fault injection service 143 could use a machine-learning model 147 to identify tests 156 that are similar to the test 156 for which the dry-run is being performed. The fault injection service 143 could then use a machine-learning model 147 to predict how the test 156 would impact the application 200 based at least in part on how similar tests 156 impacted applications 200 with similar application schemas 148.

However, sometimes predictions of the machine-learning models 147 might not offer sufficient accuracy or have a sufficiently high confidence score. In these situations, the fault injection service 143 could duplicate the application 200 and cause the test to be performed on the duplicated application 200. For example, the fault injection service 143 could create a clone or copy of the services, components, data, and configuration of the application 200. The fault injection service 143 could even mirror all network traffic destined for the application 200 and forward the mirrored network traffic to the duplicated application 200. The fault injection service 143 could then perform the test 156 on the duplicated application 200 and report the results to the test service 153. The test service 153 could then present the test 156 results to the user as a prediction of the systems that the test 156 would impact and how the test 156 would impact those systems.

In some instances, the fault injection service 143 or the test service 153 could receive an indication from an administrator of the application 200 that the predicted blast radius is unacceptable after the test 156 is performed. In response, the fault injection service 143 or the test service 153 could modify the test 156 to generate a modified test 156. The fault injection service 143 or the test service 153 could then rerun the modified test 156 to identify a new predicted blast radius. Similarly, the fault injection service 143 or the test service 153 could receive confirmation from an administrator of the application 200 that the predicted blast radius is acceptable. In response to receipt of the confirmation, the fault injection service 143 or the test service 153 could perform the test 156 on the application 200.

FIG. 2 illustrates a simple example of an application 200 that could be hosted within the cloud provider network 100. Although the application 200 of FIG. 2 merely illustrates one architecture of an application 200, it should be noted that other architectures for an application 200 could also be deployed within the cloud provider network 100. The various embodiments of the present disclosure would work with any application 200, regardless of its particular architecture.

The application 200 can have a number of components. For example, the application 200 could include an application gateway 203, which acts as destination for network traffic to the application 200. Accordingly, the application gateway 203 operates as both an ingress point and/or an egress point for network traffic sent to the application 200 or sent from the application 200. The application gateway 203 could perform a number of traffic routing functions, such as load-balancing between virtual compute instances 116 (e.g., virtual compute instance 116*a* and virtual compute instance 116*b*) configured to handle requests sent to the application 200 or other routing functions. The virtual compute instances 116 could make use of a cloud provider service 142. In order to spread the load, the virtual compute instances 116 could be connected to a load balancer 206 assigned to the application 200. Requests to the cloud provider service 142 from a virtual compute instance 116 could be sent to the load balancer 206, which would route the request to either the cloud provider service 142*a* or the cloud provider service 142*b* using one of various load balancing techniques.

In some instances, a virtual compute instance 116 of one application 200 could also be in data communication with another application 200. For example, an application 200 for a video streaming service could have a virtual compute instance 116 that has a data connection to a billing application 200. These types of connections could cause a test 156 performed on one application 200 to unexpectedly impact another application 200.

Figure 3:
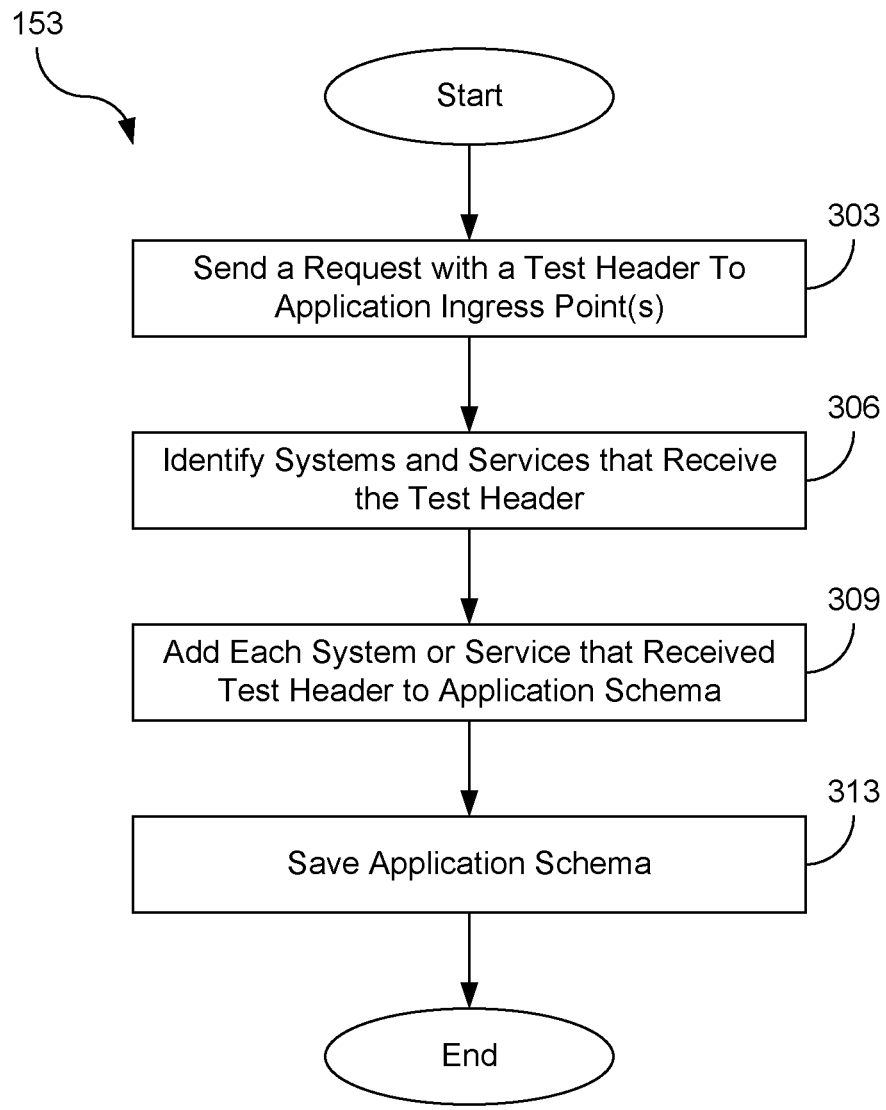
FIG. 3 is a flowchart illustrating one example of functionality implemented within the cloud provider network of FIG. 1 according to various embodiments of the present disclosure.

Referring next to FIG. 3, shown is a flowchart that provides one example of the operation of a portion of the test service 153. The flowchart of FIG. 3 provides merely an example of the many different types of functional arrangements that can be employed to implement the operation of the depicted portion of the test service 153. As an alternative, the flowchart of FIG. 3 can be viewed as depicting an example of elements of a method implemented within the cloud provider network 100.

Beginning with block 303, the test service 153 can begin the process of creating an application schema 148 by sending a request with a test header to each ingress point of an application 200. For example, the fault test service 153 could include a custom hypertext transfer protocol (HTTP) header in an HTTP request made to an application gateway 203 of the application 200. Other types of network traffic could include similar custom headers or flags. The custom header or flag could include information such as a test identifier that identifies the test 156 that caused the application schema 148 to be created.

The custom header or flag (e.g., the custom HTTP header) could act as an indicator to components of the application 200 or other components of the cloud provider network 100 that an application schema 148 is being created for the application 200. When a component of the application 200 or component of the cloud provider network 100 receives a request that includes the custom header or flag, the component of the application 200 or other component of the cloud provider network 100 can process the request normally. However, the component of the application or cloud provider network 100 can also include the custom header or flag in any request or response it sends across the network as a result of receiving the request with the custom header or flat. For example, if a web server were to receiver an HTTP request with the test header, the web server could include the test header in any request it sends to a database server, object storage service 141, or elastic block storage service 136 in order to generate a response. The test header would also be included in the response returned by the web server in response to the HTTP request.

The custom header or flag could be used to form a map the application 200, including its dependencies. For example, the requests and responses containing the custom header or flag (e.g., the custom HTTP header) could be written to log files, sometimes referred to as flow logs, that store information about each request received or response provided a component of the application 200 or component of the cloud provider network 100. In other instances, each time a component of the application 200 or cloud provider network 100 receives a request or response containing the custom header or flag, it could send a beacon message to the test service 153. The beacon message could include information such as the test identifier within the test header, the source of the message or request that included the test header, the identity of the component of the application 200 or component of the cloud provider network 100 that received the test header, and potentially other information.

Then, at block 306, the test service 153 can identify systems, services, or other components of the application 200 or cloud provider network 100 that received the request or response that included the test header. This could be done in a variety of manners. For example, the test service 153 could analyze the flow logs discussed at block 303 to identify all systems that received network traffic containing the test header. This could be done using a regular expression to search for log entries for network traffic that contained a matching test identifier contained in the test header. As another example, the test service 153 could track beacon messages received from components of the application 200 or the cloud provider network 100 that received network traffic containing the test header.

Next, at block 309, the test service 153 can create the application schema 148 for the application 200. For example, the test service 153 could add each system, service, or component identified in the flow logs associated with the application or cloud provider network 100 to a list of components and dependencies of the application 200. As another example, the test service 153 could add the identity of each system or service that sent a beacon message to the test service 153 to the list of components and dependencies of the application 200.

In addition, the relationships between the components and dependencies can also be added to the application schema 148. For example, an analysis of the flow logs can show which components are dependencies of other components based on the pattern in which the components send requests and responses to each other. Similarly, the beacon messages can show which components are dependencies of other components since the collection of beacon messages can show the pattern in which the components send requests and responses to each other. In various embodiments of the present disclosure, various machine-learning techniques can be used to identify these dependencies from the network traffic illustrated by the flow logs and/or the beacon messages.

Subsequently, at block 313, the test service 153 can save the application schema 148 for future use. The illustrated process could then end.

Figure 4:
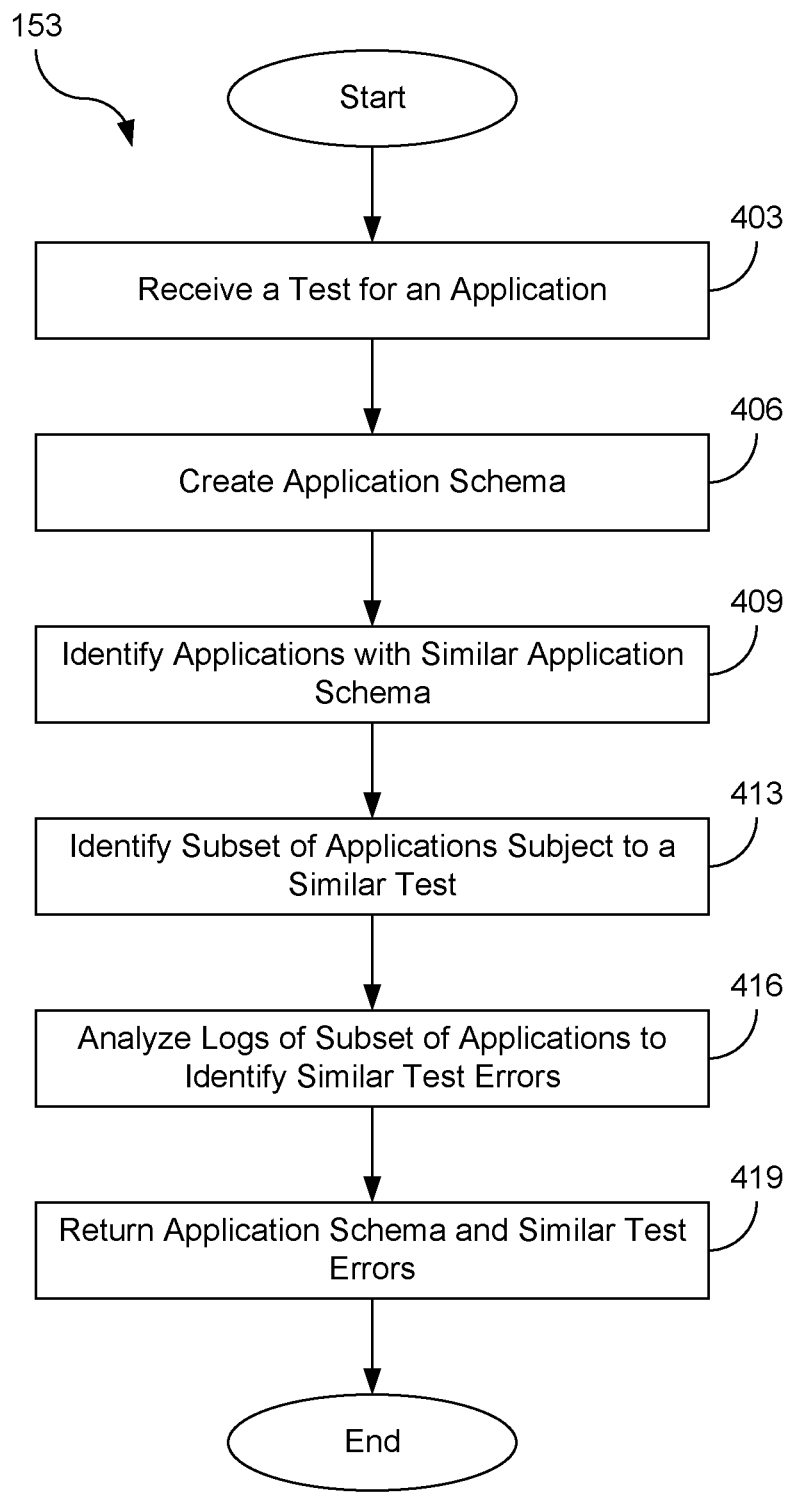
FIG. 4 is a flowchart illustrating one example of functionality implemented within the cloud provider network of FIG. 1 according to various embodiments of the present disclosure.

Referring next to FIG. 4, shown is a flowchart that provides one example of the operation of a portion of the test service 153. The flowchart of FIG. 4 provides merely an example of the many different types of functional arrangements that can be employed to implement the operation of the depicted portion of the test service 153. As an alternative, the flowchart of FIG. 4 can be viewed as depicting an example of elements of a method implemented within the cloud provider network 100.

Beginning with block 403, the test service 153 can receive a test 156, as well as an application identifier that identifies the application 200 or other resources in the cloud provider network 100 to be tested using the fault instructions 159 specified in the test 156. The test service 153 can also receive an indication (e.g., a flag, Boolean argument, etc.) that the test 156 is to be simulated rather than executed on the specified application 200 or cloud provider network 100 resources.

Then, at block 406, the test service 153 can create an application schema 148 for the application 200 to be tested. The process for creating the application schema 148 for an application 200 has been previously described and illustrated in FIG. 3. Once the application schema 148 is created, it could be saved for future analyses by storing an association between the schema 148, the test 156, and/or the application identifier 200 of the application to be tested.

Next at block 409, the test service 153 can identify applications 200 with an application schema 148 that is similar to the application schema 148 created at block 406. For example, the test service 153 could use a machine-learning model 147 to analyze the application schema 148 and identify stored application schemas 148 of other applications 200 that are sufficiently similar. Whether or not the application schema 148 is deemed to be sufficiently similar could be based at least in part on a predefined value or threshold. For example, if the machine-learning model 147 produces a value between 0 and 1 representing the degree of similarity, a predefined threshold (e.g., 0.9) could be used as a cutoff for the fault injection service 143 to determine whether another application schema 148 identified by the machine-learning model 147 can be considered sufficiently similar.

Moving on to block 413, the test service 153 can identify tests 156 that are similar to the test 156 received at block 403. For example, the test service 153 could retrieve all of the tests 156 that had been previously executed against one of the applications 200 identified at block 409. The test service 153 could then use a second machine-learning model 147 to identify tests 156 that are similar to the test 156 received at block 403. Whether or not a test 156 is deemed to be sufficiently similar could be based at least in part on a predefined value or threshold. For example, if the machine-learning model 147 produces a value between 0 and 1 representing the degree of similarity, a predefined threshold (e.g., 0.9) could be used as a cutoff for the fault injection service 143 to determine whether another test 156 can be considered sufficiently similar to the test received at block 403.

Proceeding, at block 416, the test service 153 can analyze log files to identify errors that occurred when similar tests 156 were executed on similar applications 200. For example, each test 156 could be associated with a test identifier. The test service 153 could search logs (e.g., flow logs, application logs, systems logs, event logs, etc.) associated with the similar applications 200 of the respective application schemas 148 identified at block 409 for errors that occurred while a test 156 associated with a test identifier of one or more of the similar tests 156 identified at block 413 were executing. This could be done using regular expressions or other text processing or parsing techniques or using a machine-learning model 147. The identified errors could be stored in a list of errors to be returned to the test service 153.

Subsequently, at block 419, the test service 153 can return the application schema 148 created at block 406 and/or the errors identified at block 416 to the submitter of the test 156 to inform the submitter of the types of errors that could be expected if the test 156 were executed on the application 200 based at least in part on the historical data of similar tests 156 performed on applications 200 with a similar application schema 148.

Figure 5:
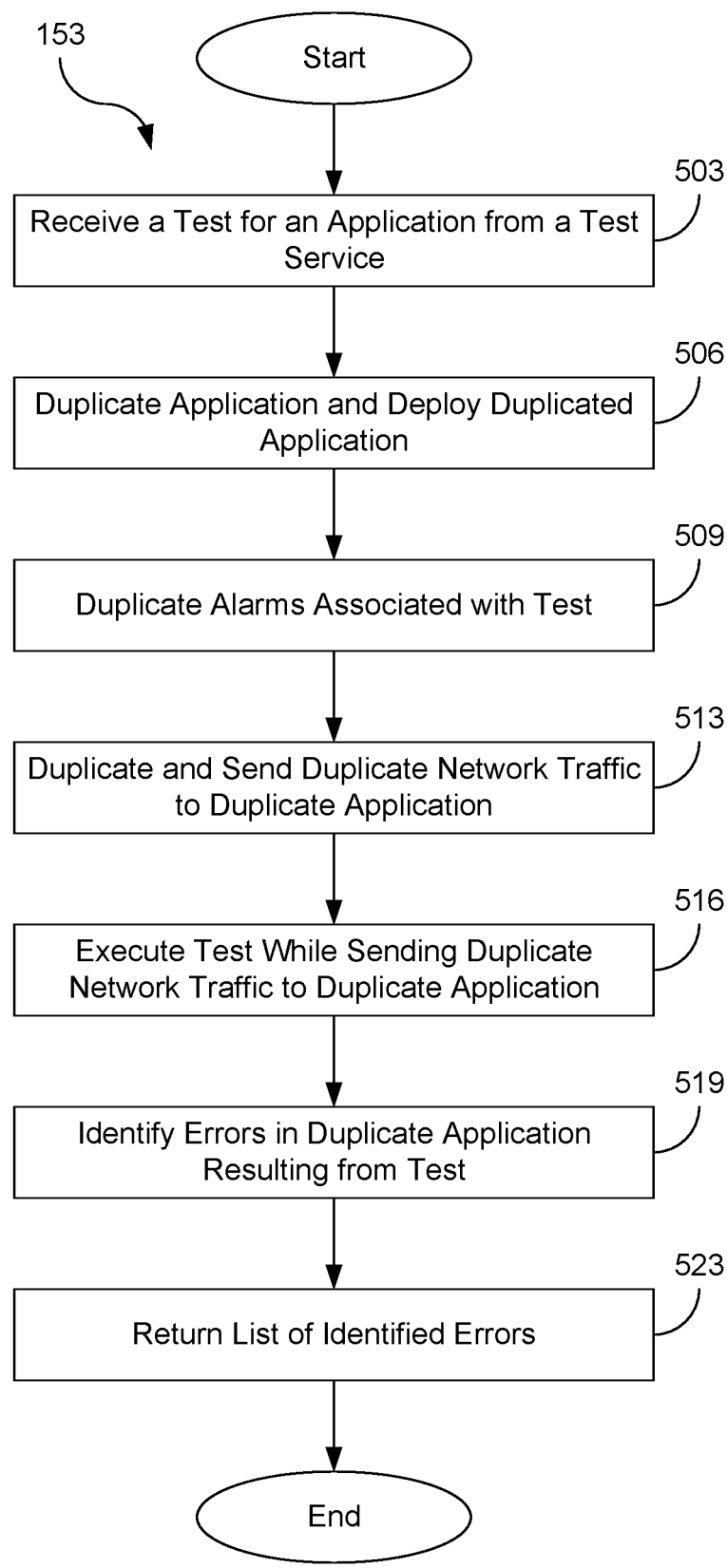
FIG. 5 is a flowchart illustrating one example of functionality implemented within the cloud provider network of FIG. 1 according to various embodiments of the present disclosure.

Referring next to FIG. 5, shown is a flowchart that provides one example of the operation of a portion of the test service 153. The flowchart of FIG. 5 provides merely an example of the many different types of functional arrangements that can be employed to implement the operation of the depicted portion of the test service 153. As an alternative, the flowchart of FIG. 5 can be viewed as depicting an example of elements of a method implemented within the cloud provider network 100.

Beginning with block 503, the test service 153 can receive a test 156, as well as an application identifier that identifies the application 200 or other resources in the cloud provider network 100 to be tested using the fault instructions 159 specified in the test 156. The test service 153 can also receive an indication (e.g., a flag, Boolean argument, etc.) that the test 156 is to be simulated rather than executed on the specified application 200 or cloud provider network 100 resources.

Then, at block 506, the test service 153 can duplicate the application 200 identified at block 503 and deploy the duplicated application 200 within the cloud provider network 100. For example, any virtual compute instances 116 could be cloned, including their state, and deployed within the cloud provider network 100. Any resources or resource allocations, such as elastic block storage volumes, data in the object storage service 141, or services provided by one or more cloud service providers 142 could also be duplicated. Configurations and configuration states could also be duplicated, as well as any other resources or connections present in the original application 200. In some instances, only a small portion of the application 200 might be duplicated, such as when an application 200 is large and the cost of duplication of the application 200 would be immense.

Next, at block 509, the test service 153 can duplicate any alarms 149 specified as evaluation criteria 163 for the test 156. These duplicate alarms 149 could be configured to alert if a triggering event occurs within the duplicate application 200.

Moving on to block 513, the test service 153 can duplicate network traffic sent to the application 200 to the duplicate application 200. For example, the test service 153 could instantiate a traffic mirror or similar service and place it in front of the application gateway(s) 203 for the application 200 and the duplicate application 200. The test service 153 could then configure any routing rules or tables to route traffic to the traffic mirror or similar service instead of the application gateway(s) 203 for the application 200. The traffic mirror could then duplicate the traffic and send original network traffic to the original application 200 and send the duplicate network traffic to the duplicate application 200. In some instances, however, only a small portion of the network traffic might be duplicated, such as when the amount of network traffic is significant enough that to duplicate all of the network traffic would overwhelm portions of the cloud provider network 100.

Proceeding to block 516, the test service 153 can execute the test 156 received at block 503 on the duplicate application 200. For example, the test service 153 could cause the fault injection service 143 to execute the fault instructions 159 specified by the test 156 with the duplicate application 200 as the target of the test 156. This could be done while the duplicate network traffic is sent to the duplicate application 200 to give the most accurate simulation of the test 156 on the production application 200 as possible.

Then, at block 519, the test service 153 could identify any errors that occurred while the test 156 was executed at block 516. For example, the test service 153 could query the monitoring service 146 to determine whether any duplicated alarms 149 were triggered while the test 156 was running. As another example, the test service 153 could compare the log files associated with the application 200 with the log files associated with the duplicated application 200 to determine whether there were any unexpected behaviors or errors that occurred within the duplicate application 200 while the test 156 was running. For example, a machine-learning model 147 could be used to compare the behavior of the application 200 with the behavior of the duplicate application 200 to identify any discrepancies, errors, or unexpected behavior. The identified errors could be stored in a list of errors to be returned to the test service 153.

In some implementations, however, one or more machine learning models 147 could be used to extrapolate if any errors should be present. For example, in those situations where only a portion of the application 200 were duplicated and/or only a portion of the network traffic were duplicated, a machine learning model 147 could be used to extrapolate whether one or more errors should be present, as well as the types of errors that should be present, based at least in part on the behavior exhibited by the duplicated portion of the application 200 and/or the duplicated portion of the network traffic.

Subsequently, at block 523, the test service 153 can return the or the errors identified at block 519 to the submitter of the test 156, thereby informing the submitter of the types of errors that could be expected if the test 156 were executed on the application 200 based at least in part on the result of executing the test 156 on the duplicate application 200.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
at least one host computing device executing an application; and
a fault injection service, implemented on a set of computing devices, configured to simulate performance of a fault injection test on the application to identify a predicted blast radius of actually performing the fault injection test, wherein the fault injection service is configured to at least:
create an application schema representing a plurality of systems or services that are involved in the execution of the application by at least:
sending a test request with a test header to each ingress point of the application;
searching flow logs for individual requests or responses containing the test header; and
adding a source of each request or response and a destination of each request or response to the application schema;
identify a plurality of applications with a similar application schema;
identify, a subset of the plurality of applications that have experienced a similar fault injection test;
analyze log files associated with each of the subset of applications to identify errors that occurred during the similar fault injection test; and
based on the identified errors, identify a subset of the plurality of systems or services likely to be impacted as a result of performance of the fault injection test; and
output information representing the subset of the plurality of systems or services as the predicted blast radius of performing the fault injection test.

2. The system of claim 1, wherein the configuration of the fault injection service to analyze the log files associated with each of the subset of applications to identify errors that occurred during the respective similar fault injection test further configuration of the fault injection service to at least identify, with a third machine-learning model, errors that occurred during the respective similar fault injection test as a result of the similar fault injection test.

3. The system of claim 1, wherein the fault injection service is further configured to at least:
- receive an indication from an administrator of the application that the predicted blast radius is unacceptable;
- modify the fault injection test to generate a modified fault injection test; and
- rerun the fault injection test to identify a new predicted blast radius.

4. The system of claim 1, wherein the fault injection service is further configured to at least:
- receive confirmation from an administrator of the application that the predicted blast radius is acceptable; and
- in response to receipt of the confirmation, perform the fault injection test on the application.

5. A method, comprising:
- receiving a test for an application;
- duplicating the application to deploy a duplicate application;
- executing the test on the duplicate application;
- identifying errors that occurred in the duplicate application during execution of the test, wherein identifying the errors comprises:
  - duplicating an alarm associated with the test as a duplicate alarm associated with the duplicate application; and
  - determining that the duplicate alarm is triggered during execution of the test; and
- providing a response that includes the identified errors.

6. The method of claim 5, further comprising:
- duplicating network traffic destined for the application to generate duplicate network traffic; and
- sending the duplicate network traffic to the duplicate application.

7. The method of claim 6, wherein the duplicated network traffic is sent to the duplicate application for a duration of the test.

8. The method of claim 5, wherein identifying errors that occurred in the duplicate application during execution of the test further comprises comparing a log associated with the duplicate application to a respective log associated with the application to identify errors that occurred within the duplicate application as a result of execution of the test.

9. The method of claim 8, wherein the errors that occurred within the duplicate application as a result of the execution of the test are identified using a machine-learning model.

10. The method of claim 5, further comprising:
- sending a test request with a test header to each ingress point for the application; and
- searching flow logs for individual requests or responses containing the test header.

11. The method of claim 10, further comprising including a source of each request or response and a destination of each request or response in the response to the test.

12. A system, comprising:
- a computing device comprising a processor and a memory; and
- machine-readable instructions stored in the memory that, when executed by the processor, cause the computing device to at least:
  - receive a test for an application;
  - create an application schema representing a plurality of systems or services that are involved in the execution of the application;
  - identify, with a first machine-learning model, a plurality of applications with a similar application schema;
  - identify, with a second machine-learning model, a subset of the plurality of applications that have experienced a similar test;
  - analyze log files associated with each of the subset of applications to identify errors that occurred during the similar test; and
  - provide each of the identified errors in response to receipt of the test.

13. The system of claim 12, wherein the machine-readable instructions that cause the computing device to create an application schema representing a plurality of systems or services that are involved in the execution of the application further cause the computing device to at least:
- send a test request with a test header to each ingress point for the application;
- search flow logs for individual requests or responses containing the test header; and
- add a source of each request or response and a destination of each request or response to the application schema.

14. The system of claim 12, wherein the machine-readable instructions that cause the computing device to create an application schema representing a plurality of systems or services that are involved in the execution of the application further cause the computing device to at least:
- send a test request with a test header to each ingress point for the application;
- receive a beacon message from each system or service that receives the test header; and
- add each system or service that received the test header to the application schema.

15. The system of claim 12, wherein the machine-readable instructions that cause the computing device to analyze the log files associated with each of the subset of application to identify errors that occurred during the similar test further cause the computing device to at least identify, with a third machine-learning model, errors the errors that occurred during the similar test as a result of the similar test.

16. The system of claim 12, wherein the machine-readable instructions further cause the computing device to at least provide the application schema to the test service in response to receipt of the test.

17. The system of claim 13, wherein the test header includes a unique identifier for the test.

18. The system of claim 13, wherein the test header comprises a custom hypertext transfer protocol (HTTP) header.

19. The system of claim 12, wherein the log files comprise flow logs.

* * * * *